US 6,841,320 B2

(12) United States Patent
Lazarev et al.

(10) Patent No.: US 6,841,320 B2
(45) Date of Patent: Jan. 11, 2005

(54) METHOD OF FABRICATING ANISOTROPIC CRYSTAL FILM ON A RECEPTOR PLATE VIA TRANSFER FROM THE DONOR PLATE, THE DONOR PLATE AND THE METHOD OF ITS FABRICATION

(75) Inventors: Pavel I. Lazarev, Belmont, CA (US); Natalya A. Ovchinnikova, Mendeleevo (RU)

(73) Assignee: Optiva, Inc., South San Francisco, CA (US)

( * ) Notice: Subject to any disclaimer, the term of this patent is extended or adjusted under 35 U.S.C. 154(b) by 0 days.

(21) Appl. No.: 10/358,607

(22) Filed: Feb. 4, 2003

(65) Prior Publication Data

US 2003/0148196 A1 Aug. 7, 2003

(30) Foreign Application Priority Data

Feb. 6, 2002 (RU) ...................................... 2002102943

(51) Int. Cl.⁷ ............................ G03F 7/34; B44C 1/165
(52) U.S. Cl. ........................ 430/20; 400/200; 400/253; 400/254; 400/964; 156/234; 503/227
(58) Field of Search ........................ 430/20, 200, 253, 430/254, 964; 156/234; 503/227

(56) References Cited

U.S. PATENT DOCUMENTS

| | | | |
|---|---|---|---|
| 4,743,463 A | 5/1988 | Ronn et al. | |
| 4,923,860 A | 5/1990 | Simons | |
| 4,978,652 A | 12/1990 | Simons | |
| 5,024,989 A | 6/1991 | Chiang et al. | |
| 5,096,612 A | 3/1992 | Pinter et al. | |
| 5,156,938 A | 10/1992 | Foley et al. | |
| 5,308,737 A | 5/1994 | Bills et al. | |
| 5,352,562 A | * 10/1994 | Takahashi et al. | 430/200 |
| 5,691,103 A | * 11/1997 | Takeyama et al. | 430/200 |
| 5,693,446 A | * 12/1997 | Staral et al. | 430/200 |
| 5,693,447 A | * 12/1997 | Takeyama et al. | 430/200 |
| 5,739,296 A | * 4/1998 | Gvon et al. | 534/577 |
| 6,214,520 B1 | * 4/2001 | Wolk et al. | 430/200 |
| 6,399,166 B1 | * 6/2002 | Khan et al. | 534/607 |
| 6,485,884 B2 | * 11/2002 | Wolk et al. | 430/200 |
| 6,630,289 B1 | * 10/2003 | Kwok et al. | 430/200 |
| 2001/0029638 A1 | 10/2001 | Bobrov et al. | |
| 2002/0105608 A1 | 8/2002 | Lazarev | |
| 2002/0172813 A1 | * 11/2002 | Ogora et al. | 430/200 |
| 2003/0148196 A1 | 8/2003 | Lazarev et al. | |
| 2003/0154909 A1 | 8/2003 | Lazarev et al. | |

FOREIGN PATENT DOCUMENTS

JP 62-146960 A 6/1987

OTHER PUBLICATIONS

*Hockh's Chemical Dictionary*, Third edition, Edited by J. Grant, McGraw–Hill Book Company Inc., 1944, pp. 64–65, 448, 503.

Lewis, Richard J., Sr., *Hawley's Condensed Chemical Dictionary*, Twelfth edition, Van Nostrand Reinhold Company, New York, 1993, pp. 85, 87, 644, 714–715.

* cited by examiner

*Primary Examiner*—Richard L. Schilling
(74) *Attorney, Agent, or Firm*—Dorsey & Whitney LLP

(57) ABSTRACT

The invention pertains to the field of fabrication of devices of various purposes, which use anisotropic films: polarizers, retarders, etc., as well as technology of obtaining coatings with anisotropy of electric conductivity, magnetic properties, thermal conduction and other physical properties.

The invention includes the method of forming anisotropic crystal film on a receptor plate via transferring it from the donor plate Implementing the disclosed invention preserves the high degree of anisotropy and optical parameters of crystal films after the transfer. Additionally, it is possible to form anisotropic coatings on the surface of any configuration (including curved) and different degree of roughness; also, it is possible to transfer films of various sizes and configurations as well as multilayer coatings containing anisotropic film and form color images.

36 Claims, 2 Drawing Sheets

METHOD OF FABRICATING ANISOTROPIC CRYSTAL FILM ON A RECEPTOR PLATE VIA TRANSFER FROM THE DONOR PLATE, THE DONOR PLATE AND THE METHOD OF ITS FABRICATION

RELATED APPLICATION

This application claims priority to Russian Application No. 2002-102943 filed Feb. 6, 2002.

1. Field of the Invention

The invention pertains to the field of fabricating devices for various purposes, which utilize anisotropic films: polarizers, retarders, etc. Such devices are for example liquid crystal displays, various displays, and indicatory elements. The invention may also be used in fabrication of materials and products for automotive industry, architecture, and applied art. Besides that, the invention may be used to obtain coatings with anisotropic conductivity, magnetic properties, heat transfer and other physical properties.

In particular, the invention pertains to the technology of transferring anisotropic films or their portions from the donor plate to the receptor plate, which in turn may represent an element of the structure in a device, as well as the technology of a fabricating the donor plate for the purpose of the above transfer.

2. Background Art

There are known optically anisotropic crystal films, which are obtained from organic dyes via special fabrication operations and therefore feature high degree of anisotropy, thermal and light resistance [Gvon et al., U.S. Pat. No. 5,739, 296]. The mentioned films have been widely used as polarizing coatings, for example in fabrication of liquid crystal displays [Khan et al., U.S. Pat. No. 6,399,166]. Technology of fabricating the above films is relatively simple; however it requires special equipment and precise compliance with the fabrication conditions in order to provide reproducibility of parameters of films. During fabrication of light, indicatory and other devices, which mainly represents assembly of already prefabricated parts, it is sometimes difficult to incorporate an additional fabrication process to produce films and parts based on the above films. Additional challenges arise when one needs to fabricate anisotropic coatings with complex configurations or with small pattern features. Usually in this case one forms a continuous anisotropic coating via the known methods and then later remove certain parts of that coating. For example, there is a known method of removing parts of the coating using scotch tape. The scotch tape is adhered to the areas of the film, which are desired to be stripped of the coating, and after the tape is peeled the remaining coating on the substrate has the desired configuration. [Bobrov, Yu.A., "Dependence of the anisotropic absorption coefficient on the thickness of molecularly oriented organic dye films" (1999). *J.Opt. Technol.* 66 (6), 547–549]. This known technique does not require special equipment, however, it does not provide sufficiently sharp edge of the coating and the degree of anisotropy at the edges of the remaining regions, and it is not reproducible enough to obtain elements of small sizes.

In order to fabricate polarizing coatings with the desired configuration one may also use a patterned layer of water-soluble lacquer. After solidifying the lacquer the exposed polarizing coating is washed off with a suitable solvent (water or a mixture of water with and organic solvent). However, this method also requires carrying out several additional fabrication operations (installation of an additional fabrication station), and implementation of this method may raise difficulties in selecting suitable chemical agents (suitable composition of the lacquer for polarizing coating, solvent to remove the protective lacquer, etc.).

3M Company has developed technology which allows avoiding installation of special fabrication processes for producing polarizing films, obtained from organic dyes, with various configurations [Staral et al., U.S. Pat. No. 5,693, 446]. This technology is based on using pre-fabricated polarizing films on a base, the so called donors. This technology involves the known methods of mass transfer as a result of localized heating of the coating areas to be transferred [Chou et al., U.S. Pat. No. 5,506,189]. Heating may be implemented via thermal elements, laser radiation, etc. This method allows obtaining polarizing coating of an arbitrary shape with high resolution of the pattern.

Difficulties arising in implementation of this method are related firstly to the structure of the transferring polarizing coating and the possible degradation of optical characteristics of the coating when it is locally heated up to the temperature necessary to carry out the transfer. Polarizing coating is obtained from lyotropic liquid crystal (LLC) dyes, molecules of which aggregate into supramolecular complexes. After application of LLC onto the substrate and inflicting the external shearing force supramolecular complexes become aligned in the direction of the influence. After the film dries (removal of the solvent), alignment of molecules is conserved, which constitutes polarizing qualities of such coatings. Disorientation of molecules resulting from the heating leads to degradation of optical characteristics of the coating.

Experiments have shown that by following a number of fabrication specifications when manufacturing anisotropic coatings from LLC, one may form anisotropic crystal films [Fennell, L., Lazarev, P., Ohmura, S., Paukshto, M. "Thin Crystal Film Polarizers™", *Asia Display/IDW'01, Proceedings of The 21st International Display Research Conference in conjunction with The 8th International Display Workshops*, Nagoya, Japan, Oct. 16–19, 2001, p. 601–603; Nazarov, V., Ignatov, L., Kienskaya, K. "Electronic spectra of aqueous solutions and films made of liquid crystal ink for thin film polarizers" (2001). *Molecular Materials*, 14 (2), 153–163.] The crystal films feature better optical characteristics and resistance to external impacts. Crystallization of the mentioned films happens in the process of drying a layer of aligned liquid crystal solution, applied in a certain way. Consequently, in order to obtain reproducible degree of anisotropy in the transferred film, operation of drying the film formed on the donor plate should be designed such that the process of removing the solvent will occur under conditions, which provide formation of the crystal structure of the film. Besides that, another necessary condition of realization of the herein invention is the fact that the transfer of the anisotropic crystal film obtained from LLC should be carried out via not heating, but rather direct global or localized pressure (possibly by an impulse) applied onto the donor plate. The heating along with other methods of activation processing in this transfer process plays only a facilitating role. As opposed to that, the localized heating, even though its duration could be short, as described in [Staral et al., U.S. Pat. No. 5,693,446], represents the main propellant of the transfer of the anisotropic film, and it may lead to infringement of the film's structure and consequently degrade optical parameters due to significant temperature difference at the edge of the heated area.

Preliminary activation, i.e. preliminary influence onto the transferring areas of the film such as to weaken bonds between molecules or supramolecular complexes in the structure thereby providing the transfer of areas of the film from the donor plate to the receptor plate at significantly lower pressure. This does not result in degradation of anisotropy at the edge of the transferring areas; conversely, this has a "healing" effect on the borderline structure.

The other aspect of the activation processing of transferring areas of the film is the kind of processing, be it thermal, electromagnetic, ionic, radiation, etc., which weakens the bonds of the transferring areas with the donor plate or an underlying layer. In this case, anisotropy of the transferring areas of the film will also be preserved, while the borderline areas may indicate the "healing" effect.

SUMMARY OF THE INVENTION

The technical result of the disclosed invention is the conservation of the high degree of anisotropy and optical parameters of films after the transfer; possibility to form anisotropic coating on a surface of any configuration (including curved) and various degree of surface roughness; possibility of transferring various sizes and shapes of films; possibility to transfer multilayer coatings, which comprise anisotropic film, and multicolor patterns.

The founding aspects of the disclosed invention, which distinguishes it from the closest analogue and which allows achieving the above mentioned technical result, is the use of anisotropic crystal film obtained from molecularly aligned organic material, in particular a dye, which forms a liquid crystal phase, as well as the achievement of transfer of the film or its portions as a result of application of pressure. Heating the film in the disclosed method, along with other methods of preprocessing is used only for the purposes of activation of the film transfer, as has been mentioned above.

Technical result of the invention is achieved due to the fact that the method of fabricating anisotropic crystal film of arbitrary configuration on a receptor plate via transfer from the donor plate, involves the following steps:

bringing the receptor plate into contact with the anisotropic film of the donor plate;

activation of at least a part of the anisotropic film, intended for the transfer and/or the donor plate and/or at least a part of at least one of the layers of the donor plate, while the degree of activation should be sufficient in order to allow subsequent transfer of the film and not sufficient to degrade the degree of anisotropy of the transferring film;

the transfer of the selected areas of the anisotropic film onto the receptor plate via application of pressure simultaneously with the activation and/or after the activation, on at least the portions of the film where there is anisotropic film intended for the transfer onto the receptor plate; the magnitude of pressure should be sufficient for the transfer of at least a part of the film from the donor plate to the receptor plate and not sufficient to degrade crystalline structure and consequently to degrade optical parameters of the transferred anisotropic film.

Anisotropic crystal film, which represents an element of the donor plate, may be placed directly on the base. The base could be either a flexible polymer film, or a rigid plate, made out of glass, silicone, metal or other material. Anisotropic crystal film may also be placed within the layers formed on the base. The choice of the material of such layers will be determined on one hand by the technology of fabricating anisotropic film (homogeneity of the surface, hydrophilic property, etc.), and on the other hand by the choice of the method of activation and applying the pressure to transfer this film.

In the case when thin rigid plates are used as the base (for example glass) the activation process is preferably performed only on the areas of the anisotropic film that are due for transfer, while the pressure could be applied over the entire area of the donor plate and/or receptor plate. In the case when the base is made out of flexible material, for example a polymer, the activation process could be either local, in the areas to be transferred, or global over the entire surface of the structure. Application of pressure in the first case may be local or global, while in the second case—only local. Material, thickness and other parameters of the base, as well as the material, thickness and other characteristics of all utilized layers of the structure will be the determining factors when choosing particular regimes of activation and application of pressure.

The base could be transparent and non-transparent, but it is preferred that it has smooth surface. Usually, the base is made out of polyethers, especially polyethylene, polyethylene terephthalat (PET), ethylene naphthalate, (PEN), polysulfones, polystyrenes, polycarbonates, polyimides, complex ethers of cellulose such as cellulose acetate and cellulose butyrate, polyvinylchlorides and their derivatives, or copolymers comprising one or more of the above materials. In other words, any suitable and accessible in the industry material could be used. The base is usually from 1 to 200 $\mu$m thick, most often it is 10–50 $\mu$m.

Additional layers are usually incorporated into the structure of the donor plate to provide the optimum conditions for transferring selected areas of anisotropic crystal film onto the receptor plate. Thus, a so-called reactive layer is usually formed directly on the base and/or directly under the anisotropic crystal film; this reactive layer undergoes the most amount of changes in the process of activation and thus plays an important role in the process of transferring portions of the film. This layer may be made out of a material that is the most sensitive to the energy of the activation influence, as compared to all or some of the other layers in the structure. This could be, for example, photo activating material, capable to absorb light more than other layers in the structure during activation, and thus create areas of higher temperature in an area of anisotropic film to be transferred. Examples of such materials are dyes, which absorb ultraviolet infra red or visible ranges, corresponding to the wavelength of the activating light, metallic films, oxides of metals or other suitable absorbing materials.

Examples of materials absorbing in the infra red have been described, for example in Matsuoka, M., Infrared Absorbing Materials, Plenum Press, New York, 1990, in Matsuoka, M., Absorption Spectra of Dyes for Diode Lasers, Bunshin Publishing Co., Tokyo, 1990, as well as in various patents referenced in the prior art patent U.S. Pat. No. 5,693,446, which are U.S. Pat. Nos. 4,772,583, 4,833,124, 4,912,083, 4,942,141, 4,948,776, 4,948,777, 4,948,778, 4,950,639, 4,940,640, 4,952,552, 5,023,229, 5,024,990, 5,286,604, 5,340,699, 5,401,607, 5,360,694, 5,156,938, 5,351,617 and in European applications EP 321,923 and 568,993.

Other examples of light absorbing materials are organic and inorganic materials like soot, metals, metallic oxides, metal sulfides. Suitable chemical elements are from the groups Ib IIb, IIIa, IVa, IVb, Va, Vb, VIa, VIb and VIII of the Periodic table, as well as alloys of these elements with the elements of Groups Ia, IIa, and IIIb, or their mixtures. Additionally, this could be metals Al, Bi, Sn, B or Zn and their alloys or alloys of these metals with elements of Groups Ia, IIa and IIIb of the Periodic table. Additionally, this could be metallic oxides and sulfides Al, Bi, Sn, B, Zn, Ti, Cr, Mo, W, Co, Ir, Ni, Pd, Pt, Cu, Ag, Au, Zr and Te, and their mixtures.

At least one of these materials may be added to one or more layers of the donor plate (for example, the base, reactive layer, adhesion layer, anisotropic crystal film, protective film, etc.), or to the material of the receptor plate.

Thickness of the reactive layer is usually chosen with the range of 0.01–10 μm depending on the material and method of activation.

Particles of the above listed materials (for example, soot) may be distributed in the matrix. The matrix may be any of the known polymers capable of forming a film, such as thermo-reactive or thermo-plastic polymers including phenol resin, for example NOVOLAK (which is thermoplastic phenol—formaldehyde resin), polyvinyl acetate, polyvinyl chloride, polyacrylate, cellulose ethers and complex ethers, nitrocelluslose, polycarbonates, and mixtures of these materials. Usually, the thickness of the matrix layer with additives is from 0.05 to 5 μm thick, the preferred thickness is from 0.1 to 2 μm.

This may also be thermo-activating material, i.e. material having certain characteristics, for example low melting point, mostly depending on the temperature, as compared to the other materials in the structure (i.e. material undergoing softening or melting in the temperature range of the activation process). Reactive layer, made out of such material when heated may soften creating areas with decreased adhesion of the crystal film to the base.

One of the layers of the donor plate may be a polymer resin, wax, or wax-like material. Suitable polymer resins usually melt of soften in the range of 20–180° C.; such resins include polyethyleneglycols, aromatic sulfoamide resins, acrylate resins, polyimide resins, polychlorvinyl and chlorinated resins of polychlorvinyl, vinyl chloride—copolymers of ascetic ether of vinyl alcohol, urea resins, melamine resins, polyolephine, or copolymers of the above materials. Wax or wax-like material facilitates transferring the structure onto the surface of the receptor plate, such as paper. Suitable wax-like materials have their melting or softening point in the range from 35 to 140° C., and comprise (the supreme fatty acid), ethanolmines such as stearic acid monoethanolamide, laural acid monoethanolamide, coconut oil, complex ethers supreme fatty acid, glycerin complex ethers supreme fatty acid like glycerin monostearic acid of complex ether; wax such as bee wax, paraffin, crystalline wax, synthetic wax, etc. and their mixtures. Since the above materials are hydrophobic, in order to create uniform anisotropic crystal film, an intermediate hydrophilic layer has to be created on the surface of the donor plate. This hydrophilic layer will be transferred onto the receptor plate together with the anisotropic film in the process of the transfer.

Directly on the anisotropic crystal film of the donor plate, and/or on the receptor plate (on the surface where the film will be transferred), one may form an adhesion layer providing bondage of the anisotropic film with the receptor plate in the process and/or after the transfer. Such adhesion layer may be represented by a so-called "sticky tape".

In the capacity of the adhesive layer one may use pressure sensitive film, or the mentioned film may be a separate element of the structure, as in the donor plate as well as in the receptor plate. The pressure sensitive film could be made out of, for example, polyvinylbutyral (PVB) or polyvinyl furfural (PVF).

Reactive layer may also be formed on the receptor plate, however using it on the receptor plate is limited by the structure of the end product. In this case activation leads to increase of adhesion of the upper layer of the donor plate (or the anisotropic crystal film) to the receptor plate. If a layer of such material is not included in the structure of the end product, activation layer can not be formed on the receptor plate.

Material and design of the receptor plate may vary over a wide range depending on the donor plate and the transfer method. Anisotropic crystal film may also be transferred onto a significantly rough receptor plate (with surface roughness up to 100 μm).

A protective layer is usually formed on the surface of the donor plate; this layer is made out of a suitable material, for example polyethylene or polyterephthalat. The mentioned layer is usually used to protect the entire structure (surface layer) in transportation and storage. The mentioned protective layer may be removed right before the creation of the areas of anisotropic crystal film on the receptor plate. However, if the mentioned protective film is a necessary component of the structure formed as result of the transfer, it may be preserved, thus the fabrication process will be shortened.

Therefore, the optimum structure of the donor plate is a "sandwich" of several layers: the base, reactive layer, anisotropic crystal film, adhesive layer and/or pressure sensitive film, and finally the protective layer of film. The structure of the donor plate is not limited by the above sequence and number of layers; it may also contain additional layers or some functional layers could be excluded from the structure. This is determined firstly by the purpose (structure) of the forming coating, the method of activation and transfer and utilized materials.

Activation may be performed on the entire structure considered above, or at least a portion of one of the layers in the structure or at least one layer in the structure, for example at least a part of the anisotropic crystal film, and/or at least a portion of the reactive film.

Activation is usually performed via thermal, and/or electromagnetic, and/or other influence, leading to weakening the bond energy in the material of the film and/or other layers, and/or decrease of adhesion of the transferring areas with the base and the underlying areas.

Activation may be performed via heating the areas to be transferred or the entire film, and/or the underlying areas or the film (films) of the donor plate, and/or the overlaying layer, and/or the receptor plate, using laser radiation of the necessary wavelength.

Regimes of the activation process are usually selected with the condition to preserve the degree of anisotropy of the transferring regions of the crystal film and to ensure the transfer of at least a part of the film from the donor plate to the receptor plate as a result of the application of pressure.

After the receptor plate is brought in contact with the crystal film or the donor plate, and/or after the activation application of pressure is performed from the side of the donor plate, and/or from the side of the receptor plate, on at least the regions of the film to be transferred.

The donor plate contains the base coated with at least one anisotropic crystal film made from at least one organic material, molecules or fragments of molecules of which have flat structure. The film may be of any configuration. Thus, it may be a continuous film of any size and shape, up to the full size of the donor plate. However, it is possible to form or apply the anisotropic crystal film of any size, up to just the required configuration for the subsequent transfer.

Anisotropic crystal film is usually represented by a crystal film, material of which contains aromatic rings and has Bragg peak at 3.4±0.2 A along one of the axes of crystallization.

The mentioned film is usually obtained from liquid crystal of at least one organic material, which forms lyotropic liquid crystal phase, via application of the liquid crystal on the base using an external aligning influence and subsequent drying.

The material most commonly used in the capacity of the organic material for obtaining liquid crystal with subsequent formation of anisotropic coating is at least one organic dye, which structure contains at least one ionogenic group, which provides its solubility in polar solvents in order to form liquid crystal phase, and/or at least one non-ionogenic group, which provides its solubility in polar and non-polar solvents in order to form liquid crystal phase, and/or at least one anti-ion, all of which in the process of formation of the optically anisotropic film either remain in the structure of a molecules or not.

In the capacity of the organic dye one usually uses at least one organic dye with the formula: {K}(M)n, where, K—the dye, chemical formula of which contains ionogenic group or groups, same or different, which provide(s) its solubility in polar solvents in order to form liquid crystal phase, M—anti-ion, n—the number of anti-ions in a molecule of the dye, which can be a fraction when a single anti-ion belongs to several molecules and in the case when n>1 the anti-ions may be different.

The film is mostly formed by the multitude of supramolecular complexes of one or several organic materials, wherein the supramolecular complexes are aligned in a particular fashion in order to provide anisotropy of the film's properties, in particular polarization of light.

The film may consist of at least two regions (fragments), situated in a single plane, axes of polarization of which on the surface of the film (in the surface layer) are directed at an angle from 0 to 90° relative to each other.

The film may be a polarizing film, and/or a retarder, and/or alignment film, and/or protective film, and/or a film simultaneously functioning as at least two of the-mentioned films, in at least a portion of the thickness of the film and/or in at least one region of the spectrum and/or on at least a portion of the surface of the film.

The donor plate may additionally contain a reactive layer, situated between the base and the film, and/or an adhesion, sticky or pressure sensitive layer, situated on the top of the film, and/or the protective layer, situated on the surface of the structure. Materials of the mentioned layers are detailed above. Using the mentioned layers facilitates the process of the transferring regions of the film due to weakening of bonds between the film and the base of the donor plate and due to increase of adhesion between the film and the receptor plate.

A light/thermo absorbing material may be added to the contents of the material of the base and/or the reactive layer, and/or the film and/or the adhesion layer.

The base of the donor plate may be made out of a polymer material or glass, or a semiconductor, or a metal.

The donor plate may additionally contain at least one layer formed on the anisotropic crystal film for its protection, and/or at least one layer promoting adhesion to the receptor plate in the process of the transfer, and/or at least one layer formed under the anisotropic crystal film to preserve the necessary degree of anisotropy during the transfer, and/or to facilitate separation of local region of the film during the transfer due to the difference in the bond strength between the layer and the base of the donor plate and the film, and/or due to modification of the underlying regions of the layer during activation.

At least one modifying additive may be added to the contents of the anisotropic crystal film, in order to aid the transfer of the desired regions of the film.

Such modifying additive may be glycerin, amount of which should not exceed 0.1% wt. in the contents of the film.

Regions of the film to be transferred onto the receptor plate or the entire film before being brought into contact with the receptor plate may be processed with ions of 2- and 3-valence metals in order to make them insoluble in water. Such processing intensifies the transfer process while preserving the high degree of anisotropy of the film.

Particular organic materials, on the basis of which one may obtain films with optical anisotropy, are known. Such materials are, for example, the following dyes:

polymethyne dyes, for example, "pseudoisocyanine", "pinacyanole"; triarilmethane dyes, for example, C.I. Basic Dye, 42035 (Turquoise Blue BB (By), <<acidic bright-blue 3>>; (C.I. Acid Blue 1, 4204), diaminoxanthene dyes, for example, sulforhodamine C; C.I. Acid Red 52, 45100 (Sulforhodamine B), acridine dyes, for example, C.I. Basic Dye, 46025 (Acridine Yellow G and T(L)), products of sulfonation of acridine dyes, for example, "trans-quinacridone"; C.I. Pigment Violet 19,46500 (trans-Quinacridone), water soluble derivatives of anthraxquinone dyes, for example "reactive blue KX"; C.I. Reactiv Blue 4, 61205, products of sulfonation of vat dyes, for example, "flavathrone", (C.I. Vat Yellow 1, 70600 (Flavanthrone)), (C.I. Vat Yellow 28, 69000), (C.I. Vat Orange 11, 70805), (C.I. Vat Green 3, 69500), (C.I. Vat Violet 13, 68700), "Indanthrone", (C.I. Vat Blue 4, 69800 (Indanthrone)), (CAS: 55034-81-6), (C.I. Vat Red 14, 71110), azodyes, for example (C.I. Direct Red 2, 23500), (C.I. Direct Yellow 28, 19555); water soluble diazine dyes, for example, (C.I. Acid Blue 102, 50320);

products of sulfonation dioxazine dyes, for example, (C.I. Pigment Violet 23, 51319), soluble thiazine dyes, for example, C.I. Basic Blue 9, 52015 (Methylene Blue), water soluble derivatives of phthalocyanine, for example, Cu-octacarboxyphthalocyanine salts, fluorescent bleaches; as well as other organic materials, for example, disodium cromoglycate, etc., capable of forming liquid crystal phase.

When the film is formed out of material according to the mentioned technology (see for example U.S. Pat. Nos. 5,739,296; 6,174,394; 6,049,428), the resulting film is a film of a material possessing anisotropy of optical properties, which are generally characterized by the complex refraction index $N_j=n_j-i*k_j$, where, $n_j$ and $k_j$ are the main components of tensors of the refraction index and the absorption coefficient, respectively. The value of the refraction index for the majority of organic materials varies with in 1.3–2.5; absorption coefficient may vary in the range from 0.0 to 1.5. Anisotropy of parameter $n_j$ determines the phase-shifting properties (retarding properties) of the film, while anisotropy of $k_j$—polarizing properties. Thus, in a general case optically anisotropic film is simultaneously a retarder and a polarizer. In a certain case, when the absorption coefficient is close to 0 in the visible range, the film in this spectral range represents just a retarder, at the same time, it may absorb light (be a polarizer) in the UV range of the spectrum.

Depending on the structure of molecules, i.e. depending on the utilized organic material, the absorption bands may be in different spectral ranges: UV, visible and IR or simultaneously in several spectral ranges. Thus, the film may feature polarizing and retarding properties in one region of the spectrum, while in other regions only retarding, which will determine the field of its application.

BRIEF DESCRIPTION OF THE DRAWINGS

The FIGS. 1–4 below, schematically present particular examples of embodiment of the disclosed invention.

FIGS. 3 and 4 schematically present a variant of creating a configuration of the polarizing crystal film for a color display.

FIG. 3 presents a side view, and FIG. 4 a view from below.

DETAILED DESCRIPTION OF THE INVENTION

Figure 1:
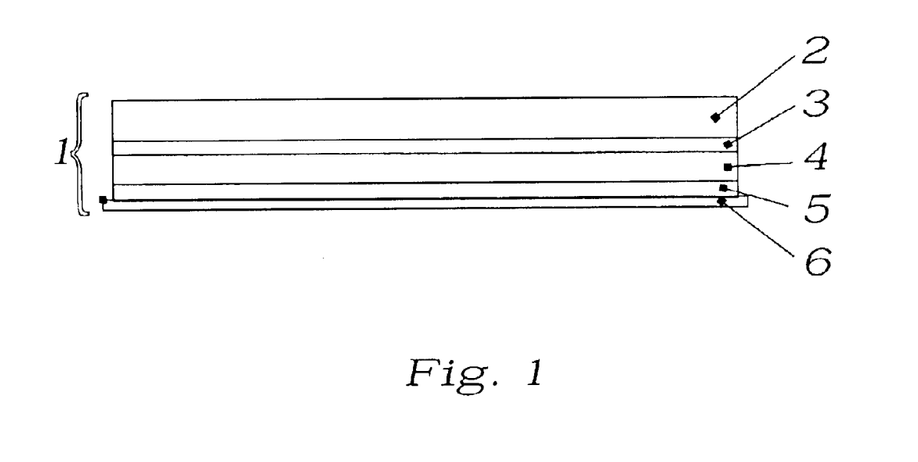
FIG. 1 is a section of the optimum structure of the donor plate.

The invention will be more clearly understood from the following description when read in conjunction with the accompanying drawings in which:

FIG. 1 illustrates a section of the optimum structure of the donor plate 1. Anisotropic crystal film 4 is formed on the reactive layer 3, which in turn is formed on the base 2; the crystal film 4 is coated with the pressure sensitive layer 5. The structure is coated with the protective film 6. If necessary, the protective film may be applied onto the side surfaces and opposite side of the structure. Plate 9 shown below, will be brought in contact with the pressure sensitive layer 5 on the anisotropic crystal film after removing the protective layer 6.

Figure 2:
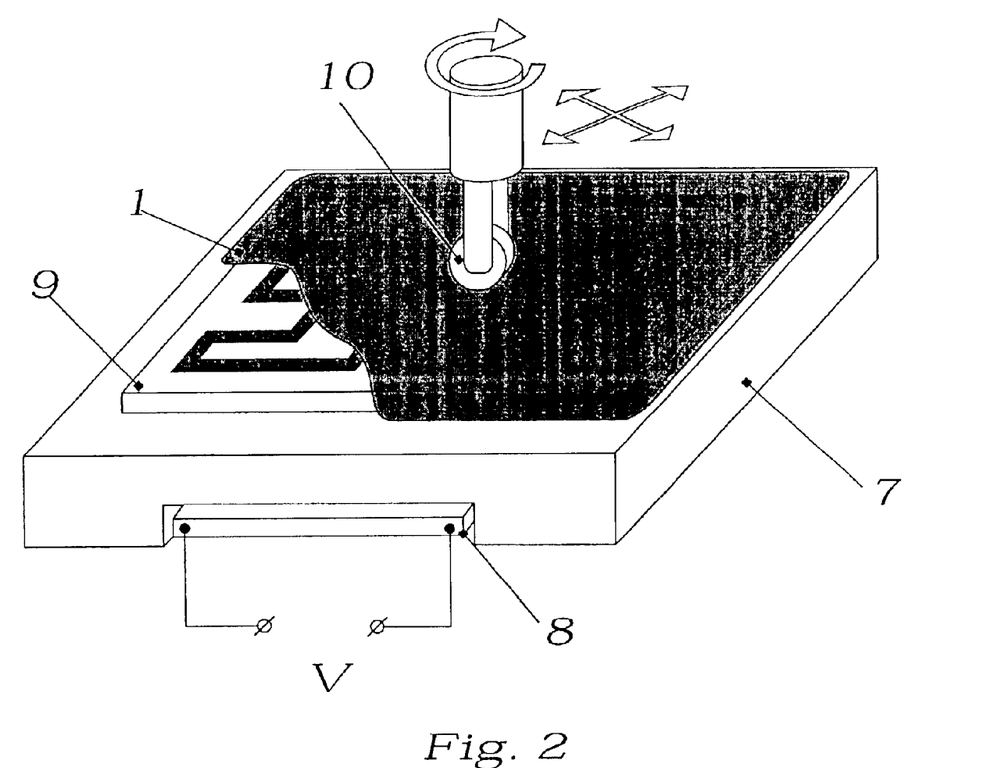
FIG. 2 is schematics of the method of forming arbitrary configurations of anisotropic crystal film on the receptor plate.

FIG. 2 schematically presents a variant of embodiment of the method of forming arbitrary configurations of anisotropic crystal film on the receptor plate. The receptor plate 9 is placed on the thermally conductive base 7, which is installed above the heating element 8. The donor plate 1 is placed on the top of the receptor plate 9 in such a way that the crystal film 4 is facing down towards the receptor plate, while the base 2 is facing upward. For example; consider a donor plate with a structure illustrated in the FIG. 1, but without the protective layer. Above the base of the donor plate there is a roller 10. This roller is capable of moving over the surface of the receptor plate in any direction when the necessary driving force is applied to it. In order to implement the method, the activation process is performed via heating the receptor plate and the structure of the donor plate by the heating element 8. After that the transfer of the desired regions of the anisotropic crystal film is preformed via rolling the roller over the surface of the base of the donor plate. The size of the roller is determined by the size of the transferring regions of the anisotropic crystal film. Heating temperature and applied pressure are selected experimentally for each different structure in order to establish conditions specified by the invention. As mentioned above, the choice of regimes necessary to implement the invention will depend on the set of particular layers in the structure, their thickness and materials.

Figure 3:
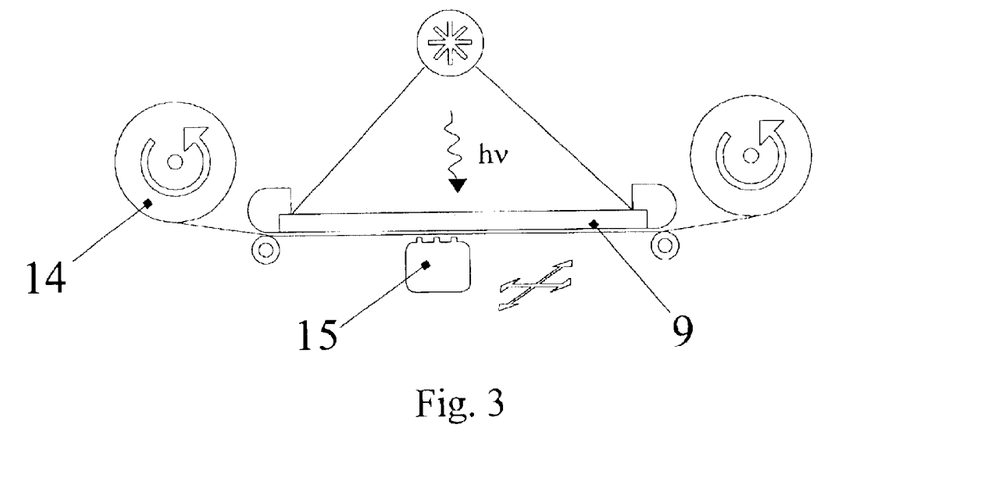
Figure 4:
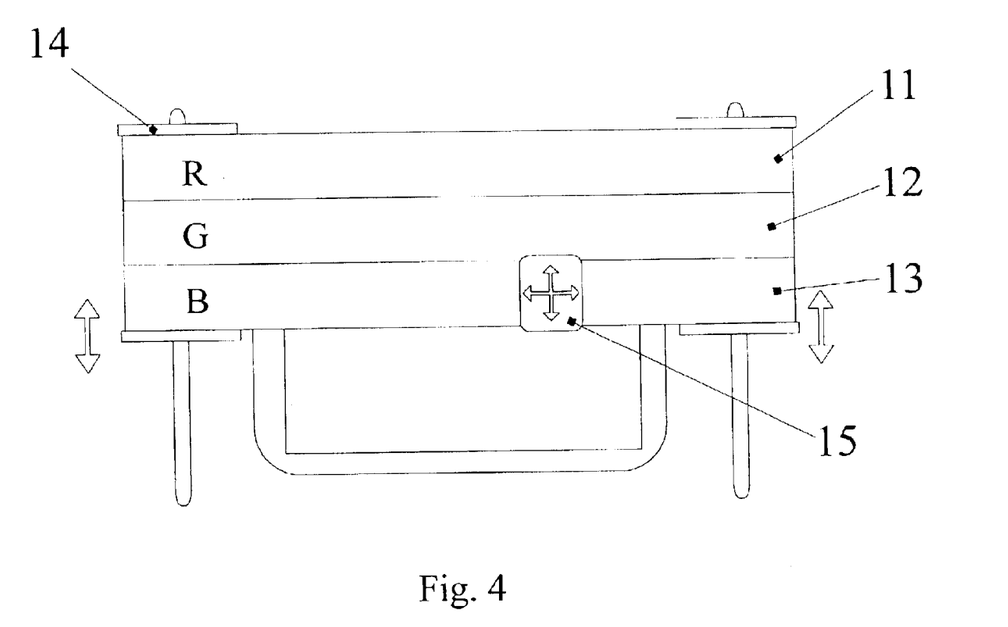

FIGS. 3 and 4 schematically present a variant of creating a configuration of the polarizing crystal film for a color display. FIG. 3 presents a side view, and FIG. 4 a view from below. Anisotropic crystal color polarizing films (red 11, blue 12, green 13), formed on the corresponding bases and reeled on spools 14 are situated under the receptor plate 9. Below the receptor plate there is the heat source, which may be either a filament lamp, or any other element. Under the bases of the donor plates there is a printing head 15, installed in such a way that it can move over the surface of the base of the donor plates in the desired direction long with the application of pressure under control. The size of the printing region corresponds to the required size of the corresponding elements in the structure of the film. If necessary, several printing head may be used, and/or different sizes of attachments may be used. Spools with films and the receptor plate are placed so that they are capable to move parallel to each other, which allows forming polarizing films for color displays on the fly. Regimes of activation and pressure are selected different for each particular case.

DESCRIPTION OF PREFERRED EMBODIMENTS

Below are the particular examples of embodiments of the invention, which however, do not deplete all possible applications of the disclosed invention.

EXAMPLE 1

When forming the donor plate on a glass base, the glass plates of suitable size are fabricated first, the surfaces of which are then modified to change adhesion of the polymer film to be applied later. To make the surface of the glass plates hydrophobic, one may use dimehtyldichlorosilane, hexamethyldisilanizan, stearic acid and other agents. Selection of the hydrophobizator is determined mainly by the thin polymer film applied later, which should satisfy the following requirements: be optically transparent, hydrophilic, mechanically strong, smooth, and no thicker than 1000 A. These requirements are met, for example, by films of celluloid obtained via the method of pouring solution of celluloid (for example 1% solution in amylacetate) over the surface of water, or films of PVA, polyvinyl alcohol, (for example 5% concentration), obtained via adsorption of aqueous solutions or centrifuging.

Next, a colloid solution (liquid crystal) of dichroic dye is prepared and applied onto the surface of the polymer film via a known method to provide formation of the anisotropic crystal film.

In order to obtain the donor plate, application of the liquid crystal film onto the base or the reactive layer is performed via the known methods described in detail in patents [U.S. Pat. No. 5,739,296; U.S. Pat. No. 6,174,394], which are based on the rod, draw plate and roll-to-roll methods. In these methods, the process of application of the liquid crystal solution layer is coupled with simultaneous alignment of the already existing supramolecular complexes under the influence of viscous forces onset in during the application when the liquid layer is stretched or one layer is shifted relative to the other. To create spatially varying orientation of the polarization axis over the surface of the polarizer, the coating tool may change the direction of motion over the surface of the receptor plate. The speed of motion and the law of change of the direction of motion will determine the orientation of the supramolecular complexes in the liquid crystal.

In the capacity of the molecularly oriented organic materials, which form liquid crystals, those examples utilize the known organic materials, which form lyotropic liquid crystal phases, molecules of which form supramolecular complexes [U.S. Pat. No. 5,739,296]. Liquid crystal is the preordered state of the system, from which, in the process of alignment of the supramolecular complexes and subsequent removal of the solvent while following the required technological conditions, an anisotropic crystal film (crystal film) is formed.

Controlling the thickness of the layer is performed through the content of the solid phase in the applied solution and the thickness of the wet layer on the receptor plate. Manufacturing parameter during formation of such layers is the concentration of solution, which is conveniently controlled in the process. Degree of crystallinity of the layer may be controlled via roentgenogram or via optical methods. Crystalline structure of the film is ensured by the combination of the manufacturing regimes of application, aligning influence and drying. Optimum condition for crystallinity will be the Bragg peak at 3.4±0.2 Å along one of the crystallographic axes of the obtained film. Crystal films with these parameters are obtained for subsequent application on to the receptor plate.

To enhance adhesion properties of the anisotropic film and increase its mechanical strength, one may coat is with a lacquer. Materials of all required auxiliary layers should be transparent in the region of the spectrum necessary for operation.

In some cases activation is performed with the use of oxygen plasma processing to increase its adhesion properties.

To transfer the necessary configuration of the anisotropic film from the donor plate obtained by the above described method, one uses flexible receptor, which is glued to the obtained multilayer structure of the donor plate using optically transparent glues, for example polyether, silicon-organic, epoxy, etc., and a printing roller.

Subsequent application of the splitting pressure separates the entire multilayer structure from the glass and thus the anisotropic film is transferred onto the flexible carrier.

Using the above described methodology and the donor plate on the glass allows performing activation process not after bringing the donor plate and the receptor into contact, but directly during fabrication of the donor plate. In other words, this operation is included in the manufacturing procedure of this donor plate. Activation may be performed as via modification of the surface of the glass base to provide its hydrophobic properties, as well as via modification of the surface of the polymer film, for example via processing it with oxygen plasma to enhance its adhesion properties.

EXAMPLE 2

Consider the following example of the method of fabricating donor plates, used for subsequent creation of color polarizer matrixes (CPM). Creating each color layer of the anisotropic film is performed in two stages. The first stage is to form a continuous anisotropic film on a smooth flat surface of the technological plate. This may be a flexible polymer film or at first a glass receptor from which the anisotropic film will later be transferred onto a flexible polymer film (this way of fabrication is used to increase the quality of fabricated anisotropic films).

The second stage is to transfer the anisotropic crystal film from the flexible polymer film onto the working surface of the base or any kind of layer of the donor plate, which features a previously formed relief, made from a positive photoresist patterned by photolithography and representing the negative pattern of one color of the CPM. After removing the photoresist via "explosive" photolithography, the remaining is the desired pattern of the polarizer film of the first layer on the receptor plate, and the receptor is ready to form numerous polarizer elements of other colors.

When fabricating CPM for a television set with flat LCD-screen, the surfaces of the glass receptors are made hydrophobic by first washing them in the acid Karo and then applying 1% solution of chromolane in isopropanole. After drying the obtained hydrophobic layer, the surface of the receptor plate is coated with 1% polyvinyl alcohol during 1 hour at 110°, which is then dried for 1 hour at 140°. Furthermore, according to the method [see U.S. Pat. No. 6,174,394 B1] the surface is coated with anisotropic crystal film from LLC phase of phthalocyanine. Then the surface is coated with lacquer based on the polyacrylic resin, after which the flexible PET, polyethylene terephthalate, donor film is glued to the created structure with polyisobutilene glue using a rubber roller. When the obtained structure is subsequently separated from the technological plate, the polarizer film is transferred onto the flexible donor film. The flexible PET donor film with the polarizer film of a dichroic dye obtained in such a way is subjected to oxygen plasma processing for 5 seconds and placed in a humid medium with relative humidity of 85%.

The working surface of the base or the structure, intended for forming the donor plate for subsequent fabrication of CPM, is coated with a positive photoresist via centrifuging, dried, exposed, developed in a standard developer, rinsed in distilled water and dried in a jet of argon. The mentioned operations lead to formation of a relief on the surface of the receptor plate, which represents the inverse of the desired pattern on the film. The receptor is baked for 5 seconds in oxygen plasma and coated with 1% aqueous solution of PVA via centrifuging. Next, the previously prepared flexible donor film coated with the polarizer film of phthalocyanine dye is roll-pressed to the receptor using a rubber roller. The obtained "sandwich" is compressed with 100–150 lg/cm$^2$ for 15 minutes. Then, the glue layer is melted and the PET donor film is removed in an oven at 120° C. After that, the working plate is washed sequentially in toluol and another solvent (usually based on toluol, acetone and etylacetate) to remove remainders of the glue and lacquer. To develop the pattern of the first color layer, the working plate (future donor plate) is placed in ultra sound bath with dioxane for 2–3 minutes. Then it is held in the oven for 30 minutes at 120° C. to bond PVC, and then placed in solution of BaCl$_2$. ($\sigma \approx 30$ mSm) for 20–30 minutes. After blowing with argon, the polarizer matrix is protected with a layer of PVA, which is applied via centrifuging from 1% aqueous solution and dried for 30 minutes at 120° C. The pattern of the second color layer is formed via performing all operations from the coating of a photoresist to drying of the protective layer. Additionally, the dye benzopurpurine is selected as the polarizer film.

Regimes in the examples can be different. However, regimes of the above manufacturing operations may be used not only in the process of fabricating the donor plate, but also directly in the process of forming anisotropic crystal film via transfer.

EXAMPLE 3

In order to transfer at least a portion of the formed film (note, that the film may be formed not on the base, but transferred onto the base being already finished) from the donor plate onto the polymer receptor, which is transparent in the operational range of wavelengths, the above film is brought into contact with the receptor, the area to be transferred is activated via localized heating to temperature 45–55° C.; most commonly the temperature is in the range 30–50, or 40–65° C. Metallic plate situated under the donor plate can provide localized heating and can provide the foundation for subsequent application of pressure. Heating may continue for 0.5 minute depending on the speed of temperature increase (gradient), under different conditions the heating time may be 0.2–1 min, 1–5 min, 0.5–10 min or other. The regimes of activation and applicable pressure are chosen with the condition that the contrast at the constant transmission and/or birefringence coefficient of the anisotropic crystal film after the transfer change no more than by 10%. The contact is a compressive device. Also, this may be a sliding cartridge and matrix print head, which performs localized influence in the selected areas of the receptor. Scanning is operated with computer. Printing is performed in the predetermined places. As a result, an image with the configuration of the optically anisotropic film with high resolution is formed on the transparent receptor. The degree of anisotropy in the transferred areas is no less than in the original films.

EXAMPLE 4

In the matrix method, the pixel size corresponds to the standard dot. One may use the standard technology of a printing head of a dot matrix printer. Also, one may use stamps, where the areas of the configuration may be cut out large and small.

In one example of embodiment of the disclosed invention, when transferring a film with a certain configuration only a part of the image is applied, then the receptor is rotated to a certain angle and another image is applied. The result is a multilayer coating, wherein the direction of optical anisotropy varies. The mentioned technology may be used to form circular polarizer, etc.

To intensify the process of the transfer one may use transparent base. Then, one may use illumination with UV source, which would lead to activation of the material of the intermediate conversion layer of the donor plate. Besides that, this will promote enhanced adhesion of the anisotropic film to the receptor plate and precise separation of its parts.

One may also use photo-chemical activation (sensibilization).

Heating the film with the laser from one side leads to thermal heating of the film, illuminating it with UV lamp on the other side results in photochemical activation (sensibilization) of the reactive layer.

REFERENCES

[1] Gvon et al., U.S. Pat. No. 5,739,296.
[2] Khan et al., U.S. Pat. No. 6,399,166.
[3] Bobrov, Yu.A., "Dependence of the anisotropic absorption coefficient on the thickness of molecularly oriented organic dye films" (1999). *J Opt. Technol.* 66 (6), 547–549
[4] RU 2136025 (and EP0961138)
[5] Staral et al., U.S. Pat. No. 5,693,446.
[6] Chou et al., U.S. Pat. No. 5,506,189.
[7] Fennell, L., Lazarev, P., Ohmura, S., Paukshto, M. "Thin Crystal Film Polarizers™", *Asia Display/IDW'01, Proceedings of The 21st International Display Research Conference in conjunction with The 8th International Display Workshops*, Nagoya, Japan, Oct. 16–19, 2001, p. 601–603.
[8] Nazarov, V., Ignatov, L., Kienskaya, K. "Electronic spectra of aqueous solutions and films made of liquid crystal ink for thin film polarizers" (2001). *Molecular Materials*, 14 (2), 153–163.
[9] Khan et al. U.S. Pat. No. 6,174,394 B1.

What is claimed is:

1. A method of forming an anisotropic crystal film on a receptor plate via transferring it from a donor plate, comprising:

bringing the receptor plate into contact with the donor plate comprising at least one anisotropic crystal film;

activating the entire donor plate, wherein the degree of activation is sufficient to provide subsequent transfer of the film upon application of pressure, but not to disrupt crystalline structure of the transferring crystal film; and simultaneous or subsequent to activation application of pressure to the part of the entire donor plate comprising the crystal film to be transferred, wherein the level of the pressure is sufficient for the transfer of at least a part of the film from the donor plate to the receptor plate and not to disrupt crystalline structure of the transferring crystal film.

2. The method according to claim 1, wherein regimes of activation and applicable pressure are chosen with the condition that the contrast at the constant transmission and/or birefringence coefficient of the anisotropic crystal film after the transfer change no more than by 10%.

3. The method according to claim 2, wherein the anisotropic crystal film is obtained from liquid crystal of at least one organic material that forms a lyotropic liquid crystal phase, via application of the liquid crystal onto the base using external aligning influence.

4. The method according to claim 1, wherein the donor plate comprises a base and at least one anisotropic crystal film, wherein said crystal film is formed from at least one organic material capable of forming liquid crystal, molecules or fragments of molecules of which have a flat structure.

5. The method according to claim 1, wherein the activation leads to decreasing strength of the material of at least one of the layers on the donor plate and/or decrease of adhesion between at least two of the layers on the donor plate, and/or increase of adhesion of the upper layer to the receptor plate.

6. The method according to claim 1, wherein the activation is performed via thermal, or electromagnetic, influence on the donor plate.

7. A method of forming an anisotropic crystal film on a receptor plate via transferring it from a donor plate, comprising the steps of:

activating at least part of the entire donor plate comprising the anisotropic crystal film to be transferred and/or at least part of the receptor plate, wherein the degree of activation is sufficient to provide subsequent transfer of the film upon application of pressure, but not to disrupt crystalline structure of the transferring crystal film;

bringing the receptor plate into contact with the donor plate; and applying pressure at least to the activated part of the donor plate, wherein the level of the pressure is sufficient for the transfer of the activated part of the film from the donor plate to the receptor plate and not to disrupt crystalline structure of the transferring crystal film, wherein the step of activating is performed before the step of bringing the receptor plate into contact with the donor plate.

8. The method according to the claim 7, wherein the configuration of the anisotropic crystal film for the transfer is formed during fabrication of the donor plate or on the already finished donor plate before bringing it into contact with the receptor plate.

9. A donor plate comprising a base and at least one anisotropic crystal film, wherein said crystal film is formed from at least one organic material capable of forming liquid crystal, and molecules or fragments of molecules of which have flat structure, and contains glycerin modifying additive.

10. The donor plate according to claim 9, wherein the material of the anisotropic crystal film contains aromatic rings and has Bragg peak at 3.4±0.2 A along one of the optical axes.

11. The donor plate according to claim 9, wherein the organic material comprises at least one organic dye, structural formula of which has at least one ionogenic group.

12. The donor plate according to claim 11, wherein the organic dye comprises at least one organic dye of the formula:

$$\{K\}(M)_n,$$

where K—the dye, chemical formula of which contains ionogenic group or groups, same or different, which provide(s) its solubility in polar solvents in order to form liquid crystal phase, M—anti-ion, n—the number of anti-ions in a molecule of the dye, which can be a fraction when a single anti-ion belongs to several molecules and in the case when n>1 the anti-ions may be different.

13. The donor plate according to claim 9, wherein the crystal film is functioning as one of a group comprising a polarizer film, a retarder film, an alignment film, a protective film, or a film simultaneously functioning as any combination of at least two of the mentioned films.

14. The donor plate according to claim 9, wherein the anisotropic crystal film consists of at least two fragments, optical axes of which are turned at an angle between 0 and 90° relative to each other.

15. The donor plate according to claim 9, wherein an adhesion layer is applied on top of all the other layers.

16. The donor plate according to claim 9, wherein a light absorbing agent is added to the contents of the material of the base and/or the adhesion layer, and/or the anisotropic crystal film.

17. The donor plate according to claim 15, wherein a light absorbing agent is added to the contents of the material forming the adhesion layer.

18. The donor plate according to claim 9, wherein the base is made out of a polymer material or a glass, or a semiconductor material, or a metal.

19. The donor plate according to claim 9, wherein the base has flat, or convex, or concave shape of the surface.

20. The donor plate according to claim 9, wherein the modifying additive is added to the material of the crystal film in the amount less than 0.1% wt.

21. The donor plate according to claim 9, wherein the anisotropic crystal film is applied in the form of at least one area of an image necessary for the subsequent transfer.

22. The donor plate according to claim 10, wherein
the surface of the base is subjected to modification and made hydrophobic;
a sublayer of optically transparent material with hydrophilic surface is applied on the top of the base; and
the anisotropic crystal film is applied onto the sublayer, in the form of at least one area of an image necessary for the subsequent transfer, and on the top of which there is at least one adhesion layer.

23. The donor plate according to claim 9, wherein at least a part of the anisotropic crystal film is applied in the form of areas differing by the color.

24. The donor plate according to claim 9, wherein the anisotropic crystal film is processed with ions of 2- or 3-valence metals to convert it into water insoluble phase.

25. A method of forming an anisotropic crystal film on a receptor plate via transferring it from a donor plate, comprising the steps of:
bringing the receptor plate into contact with the donor plate comprising a least one anisotropic crystal film;
activating at least part of the entire donor plate and/or at least a part of th receptor plate;
wherein the degree of activation is sufficient to provide subsequent transfer of the film upon application of pressure, but not to disrupt crystalline structure of the transferring crystal film; and
simultaneous or subsequent to activation, applying pressure at least to th part of the donor plate comprising the crystal film to be transferred,
wherein the level of the pressure is sufficient for the transfer of the activaed part of the film from the donor plate to the receptor plate and not to disrupt crystalline structure of the transferring crystal film;
wherein the material of the anisotropic crystal film contains aromatic rings and has Bragg peak at 3.4±0.2 A along one of the optical axes and comprises at least one organic dye of the formula:

$$\{K\}(M)_n,$$

where K—the dye, chemical formula of which contains ionogenic group or groups, same or different, which provides its solubility in polar solvents in order to form liquid crystal phase, M—anti-ion, n—the number of anti-ions in a molecule of the dye, which can be a fraction when a single anti-ion belongs to several molecules and in case when n>1 the anti-ions may be different; and
wherein the anisotropic crystal film material further comprises glycerin in the amount less than 0.1% wt.

26. The method according to claim 7, wherein regimes of activation and applicable pressure are chosen with the condition that the contrast at the constant transmission and/or birefringence coefficient of the anisotropic crystal film after the transfer change no more than by 10%.

27. The method according to claim 26, wherein the anisotropic crystal film is obtained from liquid crystal of at least one organic material that forms a lyotropic liquid crystal phase, via application of the liquid crystal onto the base using external aligning influence.

28. The method according to claimy 7, wherein the donor late comprises a base and at least one anisotropic crystal film, wherein said crystal film is formed from at least one organic material capable of forming liquid crystal, molecules or fragments of molecules of which have a flat structure.

29. The method according to claim 7, wherein the activation leads to decreasing strength of the material of at least one of the layers on the donor plat and/or decrease of adhesion between at least two of the layers on the donor plate, and/or increase of adhesion of the upper layer to the receptor plate.

30. The method according to claim 7, wherein the activation is performed via thermal, or electromagnetic, influence on the donor plate.

31. The method according to claim 1, wherein the material of the anisotropic crystal film contains aromatic rings and has Bragg peak at 3.4±0.2 A along one of the optical axes.

32. The method according to claim 31, wherein the organic material comprises at least one organic dye, structural formula of which has at least one ionogenic group.

33. The method according to claim 32, wherein the organic dye comprises at least one organic dye of the formula:

$$\{K\}(M)_n,$$

where K—the dye, chemical formula of which contains ionogenic group or groups, same or different, which provide(s) its solubility in polar solvents in order to form liquid crystal phase, M—anti-ion, n—the number of anti-ions in a molecule of the dy , which can be a fraction when a single anti-ion belongs to several molecules and in the case when n>1 the anti-ions may be different.

34. The method according to claim 7, wherein the material of the anisotropic crystal film contains aromatic rings and has Bragg peak at 3.4±0.2 along one of the optical axes.

35. The method according to claim 34, wherein the organic material comprises at least one organic dye, structural formula of which has at least one ionogenic group.

36. The method according to claim 35, wherein the organic dye comprises at least one organic dye of the formula:

$$\{K\}(M)_n,$$

where K—the dye, chemical formula of which contains ionognic group or groups, same or different, which provide(s) its solubility in polar solvents in order to form liquid crystal phase, M—anti-ion, n—the number of anti-ions in a molecule of the dye, which can be a fraction when a single anti-ion belongs to several molecules and in the case when n>1 the anti-ions may be different.

* * * * *